F. W. MEYER.
RECTIFIER SYSTEM.
APPLICATION FILED JUNE 20, 1914.

1,291,066.

Patented Jan. 14, 1919.

WITNESSES:
Fred A. Lind.
D C Davis

INVENTOR
Friedrich W. Meyer
BY
Wesley G. Carr
ATTORNEY

UNITED STATES PATENT OFFICE.

FRIEDRICH W. MEYER, OF PITTSBURGH, PENNSYLVANIA, ASSIGNOR TO WESTINGHOUSE ELECTRIC AND MANUFACTURING COMPANY, A CORPORATION OF PENNSYLVANIA.

RECTIFIER SYSTEM.

1,291,066.  Specification of Letters Patent.  Patented Jan. 14, 1919.

Application filed June 20, 1914. Serial No. 846,364.

*To all whom it may concern:*

Be it known that I, FRIEDRICH W. MEYER, a subject of the Emperor of Germany, and a resident of Pittsburgh, in the county of Allegheny and State of Pennsylvania, have invented a new and useful Improvement in Rectifier Systems, of which the following is a specification.

My invention relates to systems for the conversion of energy from alternating current to direct current, and more specifically to systems wherein energy is drawn from a plurality of alternating-current circuits of varying frequency and phase conditions and supplied to one direct-current consumption circuit, and it has for its object to provide means for carrying out the conversion specified in a simple and effective manner.

Figure 1:
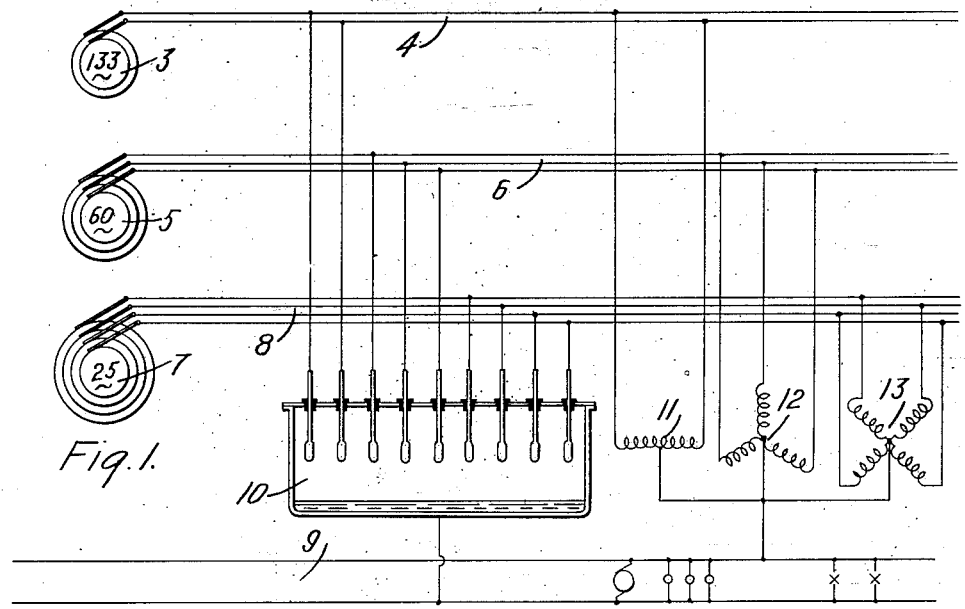
Figure 2:
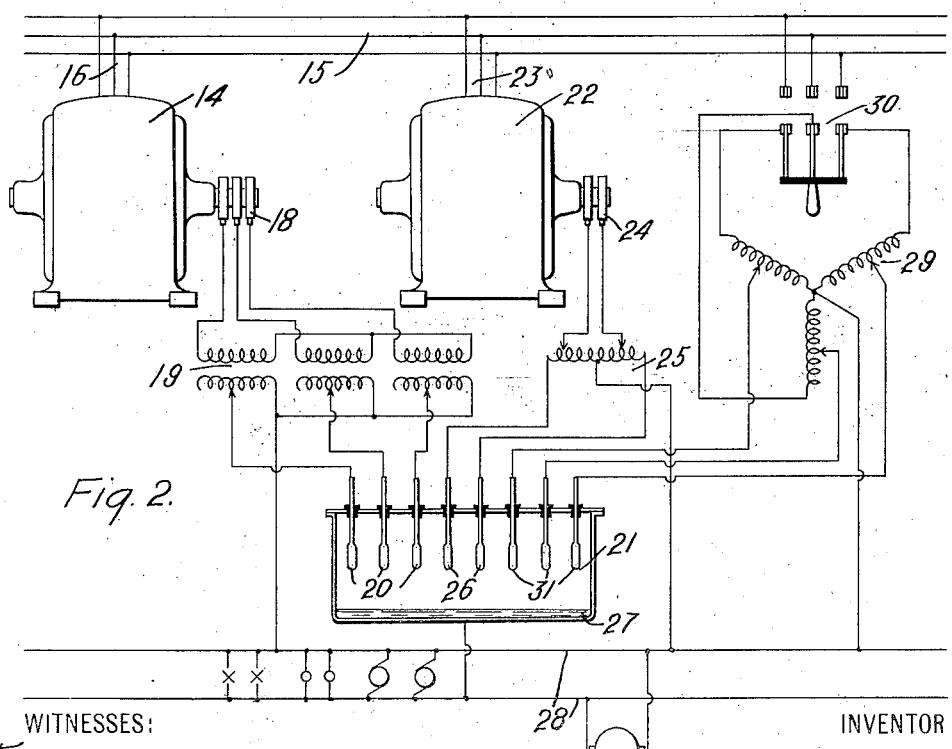

Referring to the accompanying drawing, Figure 1 is a diagrammatic view of my system in its generic aspect; and Fig. 2 is a diagrammatic view of the system showing my invention applied to the speed control of a plurality of induction motors or like apparatus.

Referring to the form of my invention shown in Fig. 1, 3 is a single-phase alternating current generator operating at, for example, 133 cycles and supplying energy to a system 4. A three-phase generator 5 operating at, for example, 60 cycles, supplies energy to a system 6 and a two-phase generator 7 operating at, for example, 25 cycles, delivers energy to a system 8.

It is desired to derive energy from all three of the circuits, 4, 6 and 8 and supply said energy to a common direct-current consumption circuit 9. In order to accomplish this object, a rectifier 10, preferably of the vapor arc type, is provided with a plurality of anodes, in this case nine being employed, one of which is connected to a line wire in one of the systems. An artificial neutral for the return of rectified current to the system 4 is indicated at 11, one for the system 6 is indicated at 12 and one for the system 8 is indicated at 13. The above described circuit will operate satisfactorily if the voltages of the three systems are such that all give the same rectified voltage. If, however, the voltage of any one of the alternating-current systems is such that it will not give the required direct-current voltage, when rectified, the defect may be easily remedied by inserting a transformer, having an adjustable ratio of transformation, between the line wires of the system in question and the respective anodes, the artificial neutral for the return of the current from the direct-current system being taken at the mid point of the secondary member of the transformer, as is well known in the art. Owing to the well known opposition of the anodes of a vapor rectifier to the flow of current in a reverse direction, it is found that, in a system of the character specified, there will be no disturbance of one of the alternating circuits by the others, but each will operate and take the share of the load determined by its voltage. If it is desired to control the amount of energy delivered from each of the alternating-current circuits, suitable transformers may be inserted between the circuits to be controlled and the rectifier and by adjusting the ratio of transformation in these transformers, any desired division of the load may be obtained.

Referring to the form of my invention shown in Fig. 2, it is well known that the torque of an induction motor, at a given speed, is determined by the amount of energy induced in the secondary member by the primary member. The most common method of increasing the energy consumption of a secondary member in order to obtain high torque at low speed, is the insertion of ohmic resistance in the secondary winding. While this is a commercially successful expedient during the short time when high induction is required in the starting operation, it is highly inefficient when it is desired to operate an induction motor for long intervals at a high slip, as is frequently the case in rolling mills and like places. Another common method of increasing the energy produced in the secondary winding is to connect said secondary winding to the primary member of a second induction motor forming the well known cascade connection. While this method of connection is commercially operable where the hypo-synchronous speed to be obtained is an aliquot part of synchronous speed, the method is not capable of application where great flexibility of speed control is desired, unless inefficient and wasteful ohmic resistance is inserted in the secondary member of the second induction motor.

I have found that, by passing the current induced in the secondary member of an induction motor through a rectifier, no matter what the slip frequency of the machine may be, if proper voltage regulation is obtained by means of a transformer, current of uniform characteristics, that is to say, direct current, may be derived from the rectifier. Furthermore, in accordance with this invention, I have found that energy from a plurality of induction motor secondaries may be rectified in one and the same rectifier, and said energy may be applied to a direct-current consumption circuit. Thus, for example, a large number of induction motors may be employed in a rolling mill and the secondary energy from all of them may be conveyed to a central rectifier, where it is converted into a form suitable to be applied to a direct-current consumption circuit.

Referring to Fig. 2, 14 is an induction motor deriving energy from the alternating-current system 15 through leads 16 and delivering alternating current from its secondary member at slip frequency, through suitable slip rings 18 and a transformer 19, having an adjustable ratio of transformation, to anodes 20 in a rectifier 21, preferably of the vapor-arc type. 22 is a second induction motor deriving alternating current for its primary member from the system 15 through leads 23 and delivering energy from its secondary member through suitable slip rings 24 and a transformer 25 having an adjustable ratio of transformation to anodes 26 in the rectifier 21. Rectified current from the cathode 27 of the rectifier 21 flows through a direct-current consumption circuit 28, and thence back to the mid point of the transformers 19 and 25, as is well known in the art. As was described in connection with Fig. 1, alternating current from the secondary members of both induction motors will be rectified and supplied to the circuit 28, and this method of connection may be multiplied indefinitely, controlling the speed of any desired number of induction motors by suitable adjustment of the corresponding transformers. It may frequently happen that there are not sufficient induction motors operating in a plant to supply the desired amount of energy to the direct-current consumption circuit 28. In order to provide for this contingency, I provide a transformer 29 which has an adjustable ratio of transformation and which may be connected directly to the system 15 by means of a suitable switch 30. The transformer 29 supplies energy to anodes 31 in the rectifier 21 and, by suitable adjustment of the transformer 29, the amount of direct current supplied to the circuit 28 may be raised to any desired amount, within the capacity of the rectifier 21 and of the supply system 15.

It is desirable that the direct-current system 28 be maintained at constant potential in order to provide voltage control for the secondary members of the induction motors. This control of potential may be provided by the system 15 through anodes in the rectifier or it may be provided by a direct-current source 28ᵃ connected to the system. Obviously, if the potential of the direct current system be caused to vary as by the supply thereto of an abnormal amount of energy from a given unit at high voltage, the speed of every motor in the installation would be at once changed. For satisfactory speed control, therefore, it is necessary that the potential of the direct-current system be maintained substantially constant, as by direct energy interchange with the alternating current system, irrespective of the tendency of one or more motors to produce alteration therein.

Having thus described my invention, what I claim is:

1. The combination with a source of alternating current, of an induction motor having its primary winding connected thereto, a rectifying device, connections from the secondary winding of the induction motor to the rectifying device, a direct-current consumption circuit supplied from the rectifying device, and means whereby energy desired in the direct-current consumption circuit in excess of that derived from the secondary member of the induction motor may be derived from the alternating-current source.

2. The combination with a source of alternating current, of an induction motor having its primary winding connected thereto, a rectifying device, connections from the secondary winding of the induction motor to the rectifying device, a direct-current consumption circuit supplied from the rectifying device, and connections from the alternating current source to the rectifying device, whereby energy desired in the direct-current consumption circuit, in excess of that derived from the secondary member of the induction motor, may be derived from the alternating-current source.

3. The combination with a source of alternating current, of an induction motor having its primary winding connected thereto, a vapor rectifier, connections from the secondary winding of the induction motor to anodes of the vapor rectifier, connections from the source of alternating current to additional anodes in the vapor rectifier, and a direct-current consumption circuit connected between the rectifier and neutral points of said source and secondary circuits, respectively.

4. The combination with a plurality of induction motors, each of which has its primary winding connected to a source of alternating current, of a multi-anode vapor rectifier, connections including voltage adjusting means between the secondary winding of each induction motor and certain anodes in said rectifier, connections between a source of alternating current of definite frequency and certain other anodes in said vapor rectifier, and a direct-current consumption circuit connected between said vapor rectifier and neutral points of said source and secondary circuits, respectively.

5. The combination with a source of alternating current, of an induction motor having its primary winding connected thereto, a vapor rectifier, an adjustable transformer, connections from the secondary winding of the induction motor to anodes of the vapor rectifier through said adjustable transformer, connections from the source of alternating current to additional anodes in the vapor rectifier, and a direct-current constant potential consumption circuit connected between the rectifier and neutral points of said source and secondary circuit, respectively, whereby the electromotive force across the terminals of the secondary member of the induction motor may be controlled.

6. The combination with a plurality of induction motors, each of which has its primary winding connected to a source of alternating current, of a multi-anode vapor rectifier, a plurality of independently adjustable transformers, connections from the secondary winding of each induction motor to anodes of said vapor rectifier through said transformers, respectively, and a direct-current constant potential consumption circuit supplied from the rectifier, whereby the electromotive force across the terminals of the secondary member of the induction motors may be controlled.

In testimony whereof, I have hereunto subscribed my name this 19th day of June, 1914.

FRIEDRICH W. MEYER.

Witnesses:
D. C. DAVIS,
B. B. HINES.